L. C. LOEWENSTEIN.
TURBINE DRIVEN ELECTRIC GENERATOR SET.
APPLICATION FILED FEB. 12, 1916.

1,302,060.

Patented Apr. 29, 1919.
2 SHEETS—SHEET 1.

Inventor,
Louis C. Loewenstein,
by Albert G. Davis
Att'y.

L. C. LOEWENSTEIN.
TURBINE DRIVEN ELECTRIC GENERATOR SET.
APPLICATION FILED FEB. 12, 1916.
1,302,060.
Patented Apr. 29, 1919.
2 SHEETS—SHEET 2.
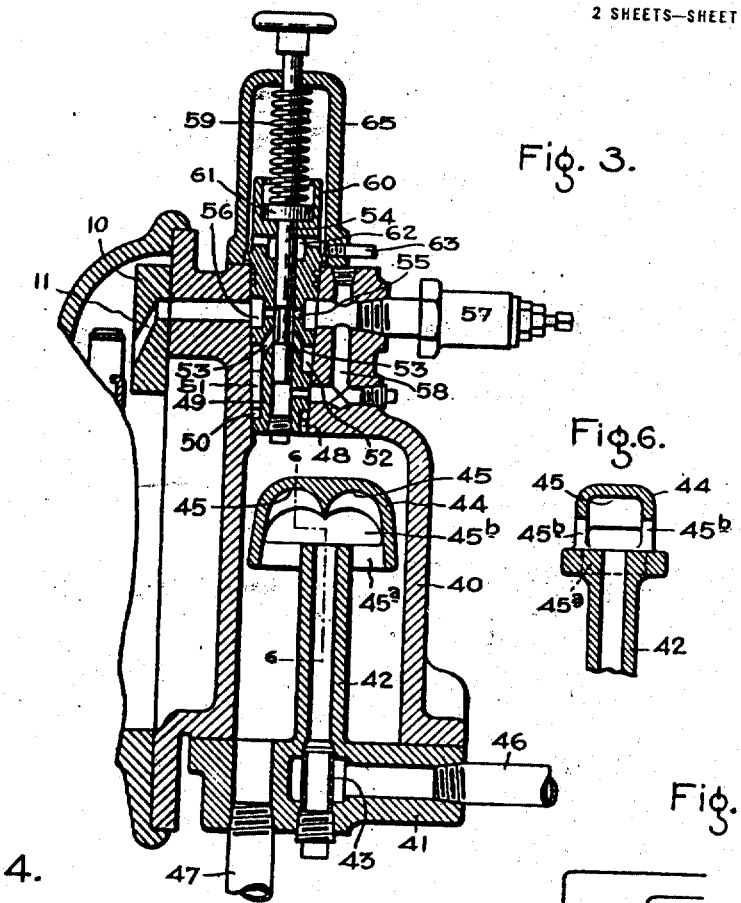
Fig. 3.
Fig. 6.
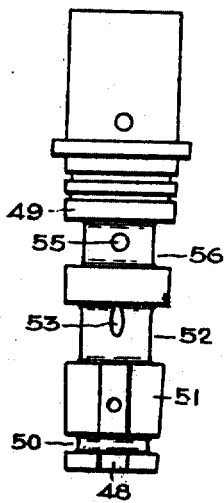
Fig. 4.
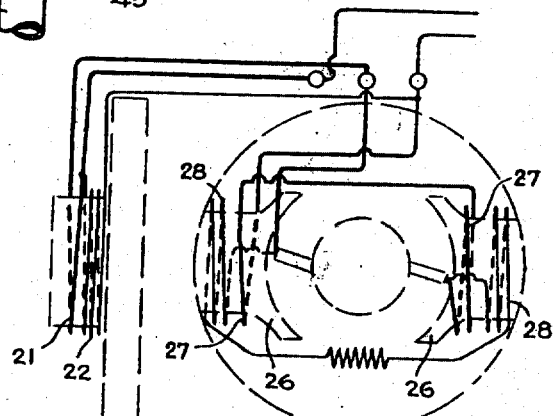
Fig. 5.
Inventor,
Louis C. Loewenstein
by Albert S. Davis
Att'y.

UNITED STATES PATENT OFFICE.

LOUIS C. LOEWENSTEIN, OF LYNN, MASSACHUSETTS, ASSIGNOR TO GENERAL ELECTRIC COMPANY, A CORPORATION OF NEW YORK.

TURBINE-DRIVEN ELECTRIC-GENERATOR SET.

1,302,060.    Specification of Letters Patent.    Patented Apr. 29, 1919.

Application filed February 12, 1916. Serial No. 77,987.

*To all whom it may concern:*

Be it known that I, LOUIS C. LOEWENSTEIN, a citizen of the United States, residing at Lynn, in the county of Essex, State of Massachusetts, have invented certain new and useful Improvements in Turbine-Driven Electric-Generator Sets, of which the following is a specification.

The present invention relates to turbine driven electric generator sets which are more especially intended for supplying current to headlights for steam locomotives. The object of the invention is to improve and simplify the construction of such apparatus, and for a consideration of what I believe to be novel and my invention, attention is directed to the accompanying description and claims appended thereto.

Figure 1:
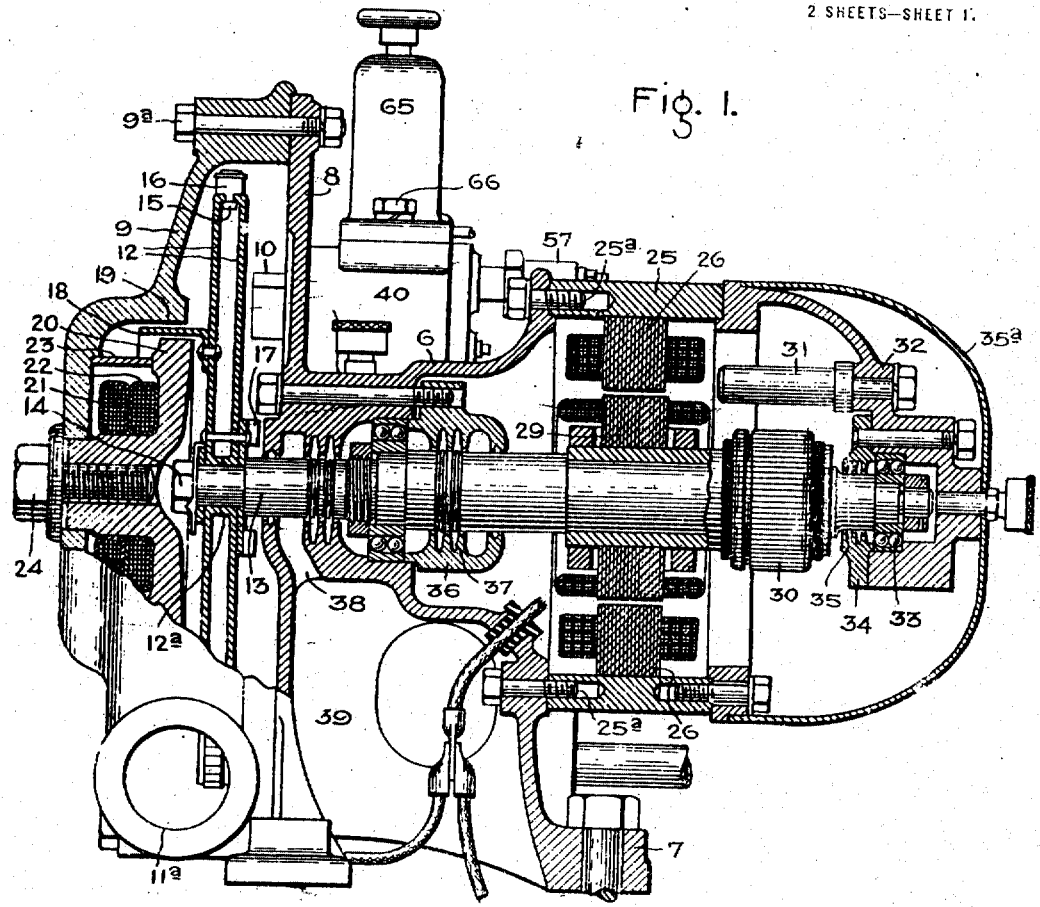
Figure 2:
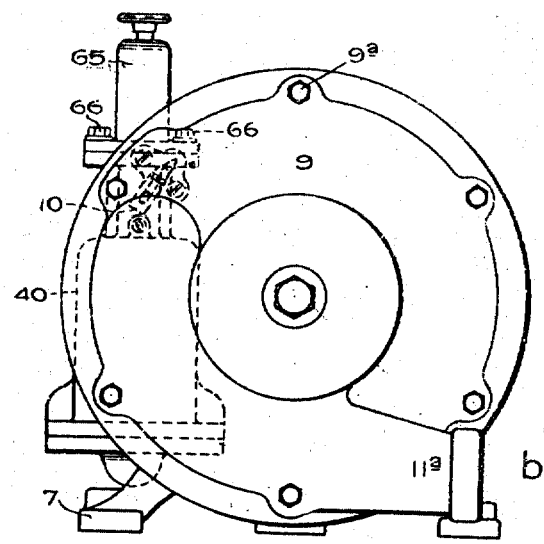

In the drawings which are illustrative of one of the embodiments of my invention, Figure 1 is an axial section of a turbo-generator; Fig. 2 is an end view of the same; Fig. 3 is a sectional view of a combined steam separator and pressure regulator; Fig. 4 is a detail view in elevation of a part of the pressure regulator; Fig. 5 is a diagram of the circuit connections of the generator and magnetic brake; and Fig. 6 is a section on line 6—6 of Fig. 3.

6 indicates the main portion of the frame of the turbo-generator. It is provided with a foot or base 7 that is bolted to some suitable part of the locomotive. The main portion is provided with a vertical disk-like member 8 which forms one wall of the turbine casing, the other wall being formed by the removable cover 9. The cover and disk are united by suitable bolts as indicated at 9ᵃ. Attached to the member 8 is a nozzle 10, Fig. 3 having one or more fluid conveying passages 11 of relatively restricted cross-section, but capable of supplying the bucket wheel with enough steam to drive it under full load conditions. Owing to the character of the section the nozzle passage appears to be directed downwardly, but as a matter of fact, the passage is substantially tangential to the wheel, as is usually the case. 11ᵃ indicates the exhaust opening for the turbine, it being formed in the cover 9. Located inside the casing is a rotor comprising disks 12 of sheet metal having inturned edges 12ᵃ, Fig. 1, that abut to form a hub through which the end of shaft 13 passes, there being a nut 14 to hold the rotor on the shaft. The outer edges of the disks are also inturned to receive and hold the bases 15 of the bucket 16 against which steam from the nozzle impinges. Mounted on the wheel near the shaft and adjacent the casing member is a fan 17 for preventing or largely reducing the leakage of steam from the casing and around the shaft. Mounted on the outer side of the wheel or rotor is a copper ring 18 that forms part of a magnetic brake. This brake is normally inactive at normal speed, but becomes effective when the speed increases. The ring extends between an annular pole piece 19 formed on the cover and a second pole piece formed by a disk 20, the latter having a hub which fits into a hole in the cover and coöperates with said cover to form a magnetic circuit. Mounted on the hub are coils of wire 21 and 22, Figs. 1 and 5, through which current from the generator passes. Coil 21 is in series with the generator and coil 22 in shunt, said coils acting in opposition to each other, or as it is commonly stated, are in bucking relation.

The series coil is so designed with reference to the shunt coil as to completely neutralize the magnetic action of the shunt coil under normal full load conditions. Now, in case a part or all of the load is removed from the generator, the speed of the generator tends to increase thereby causing an increase in the voltage across the brushes of the generator and an increase in the magnetization of the shunt winding; at the same time, the current in the series coil is decreased. The shunt coil, therefore, overpowers the series coil, and sets up a magnetic drag which tends to maintain the speed of the generator substantially constant. On the other hand, in case of overload, as when one or more lamps are added to the circuit, or in case of short circuit, the generator will tend to supply more current, but immediately this excessive current in the series winding causes the series coil to overpower the shunt coil, and the magnetic drag produced thereby increases with the electrical load, and tends to reduce the speed of the generator, and thus prevents it from delivering an excessive current. The result is, that under normal operating conditions the sum of the two loads; namely, the armature load plus the disk load, due to the excess of series ampere turns balances the power output from the turbine, and the generator is kept at substantially constant speed. To keep moisture away from the coils an annular shield 23 is provided which engages the disk and is centered by a shoulder on the cover. A threaded bolt 24 suffices to hold the disk, coil, and shield in place.

The right-hand side of the main support 6 is enlarged to form a head to which the field magnetic frame 25 of the compound wound generator is attached by bolts 25ª. The magnet is provided with suitable pole pieces 26 upon which are the series field coils 27 and shunt coils 28. 29 indicates the armature and 30 the commutator therefor, the brushes are shown in Fig. 5, but have been omitted from Fig. 1. The brush holder, stud 31 is, however, shown in this latter figure and is carried by a head 32 that is bolted to the field magnetic frame. In the head is a ball bearing 33 for the combined turbine and armature shaft. It is held in place by a flat ring 34 which has alternate projections and grooves 35 in its bore to prevent lubricant from passing freely toward the commutator. The bearing and brushes are inclosed by a cover 35ª. The left-hand end of the shaft is also supported in a ball bearing carried by the hub-like extension on the main member 6. The bearing is held in place by a ring 36, which in turn is secured by bolts. The ring also has projections and grooves 37 to prevent the free passage of oil from the bearing toward the armature. The portion of the casing on the opposite side of the bearing is provided with alternate projections and grooves to prevent the free passage of lubricant. Any exhaust steam or lubricant escaping through the shaft clearance will pass into the conduit 38 and thence into the open chamber 39. The main member 6 is also provided with a housing 40, Fig. 3, in which is located a steam separator comprising a head 41 that is bolted to the housing, a vertical tube 42 having a strainer 43 at the bottom, and a deflector 44 having downwardly curved buckets 45. Steam enters by pipe 46 and the water separated therefrom leaves by the pipe 47.

The regulation of the admission of steam to the turbo-generator is accomplished by a novel arrangement of parts organized to operate in a particular manner. In the first place, the usual speed governor is entirely omitted, and a nozzle passage 11 of such size is chosen that it will permit the required amount of steam to pass at the desired pressure, it being noted that the pressure commonly used on locomotives is materially higher than is necessary for such small turbine outputs as the one under discussion. Furthermore, the pressures vary widely with changes in load, grade, firing, etc. To reduce the effects of pressure changes of the source a pressure reducing valve is provided that reduces the pressure to a value slightly below the minimum that the source is liable to reach, said valve being automatic in its action. For example, this valve may be set to reduce the pressure to 100 lbs. Before the steam enters the valve casing, however, it has to pass through a member having a restricted orifice that has approximately the same cross-sectional area as the entrance to nozzle 11. This restricted orifice will cause a small drop in pressure, say from 200 lbs. to 195 lbs. when the normal amount of steam is passing to the turbine, but if for any reason a reduction in load on the wheel takes place and a larger quantity of steam tends to flow, the action of the orifice is such as to increase its opposition to said flow until a state of equilibrium is reached where the amount of steam passing through it is somewhat greater than before, but not enough to drive the wheel at a prohibitive or dangerous speed. For example, it may act to reduce the steam pressure to 130 lbs. This latter condition pre-supposes the sticking of the pressure reducing valve in its open position. As a further precaution a pop-safety valve is provided at some point adjacent the turbine nozzle which is set at say 105 lbs. Ordinarily this valve would open if the reducing valve sticks or fails for any cause, but if both valves fail the said orifice will come into service and prevent excessive speed of the rotor. These valves and orifice member are of the simplest types and hence initially cheap and require little or no care. By their use I am able to do away with the expensive and delicate speed governor which was formerly considered necessary. As these machines are commonly located on top of the locomotive boiler they are relatively inaccessible, and experience has demonstrated that they get little or no attention until some part fails to operate, which is, of course, liable to happen at a most unfortunate time.

Referring to Fig. 3, 48 indicates the restricted orifice above referred to. It may be located in the housing or in the tapered member 49, the latter arrangement being simpler to make. It opens into the annular groove 50 from which steam flows by the vertical passage or passages 51 to the annular groove 52, the latter having diagonal ports 53 leading to the bore of said member. Within the member is a valve 54 having a portion of reduced cross-section and around which steam flows through the ports 55 to the groove 56, the latter admitting steam to the nozzle 10 and to the pop-safety valve 57. Steam from this point is also admitted by the passage 58 to the underside of the valve 54 which tends to raise it against the action of the adjustable coiled compression spring 59. Under normal conditions the valve partially throttles the diagonal ports 53 and the steam pressure under the valve is balanced by the spring pressure, said valve rising and falling as the steam pressure changes. To steady the action of the valve a dash-pot is provided comprising the cylinder 60 and the piston 61, the latter being secured to the valve stem, and below the piston is a groove 62 formed in the member 49 and communicating with a pipe 63 to carry off any leakage steam and prevent it from getting under the piston and exerting a lifting force thereon. The tapered member 49 is held in place by a cap 65 fastened by bolts 66.

By the above described arrangement I provide a short compact structure and one so arranged that all the parts can be very readily reached for inspection and repair. By removing the cover 9 the turbine wheel and magnetic brake are accessible and by removing cover 35ª the brushes and right hand bearing can be reached. Further, by taking out bolts 25ª, the magnetic frame 25 can be removed so that the armature is exposed. The steam separator, the restricted orifice, the reducing valve and the pop-safety valve are formed in substantially one integral structure of simple design. By removing cap 65, the tapered member 49, which carries the orifice and the reducing valve, can be removed for cleaning or repair should it be found necessary.

In operation steam enters the separator by way of pipe 46 and strainer 43. It passes up through stand-pipe 42 and impinges against the deflector 44 which directs it vertically downward. The moisture separates out and escapes by way of pipe 47 while the steam rises up around the edges of the deflector and passes by way of restricted orifice 48, groove 50, passage 51, groove 52, diagonal ports 53, ports 55, and groove 56 to the nozzle 10. The functioning of the different parts of the set has been explained already in connection with the description thereof, and further description is deemed unnecessary.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In an apparatus of the character described, the combination of a main frame having a bearing, a shaft in the bearing having an overhung end, a turbine wheel on such end, a cover for the wheel fastened to the main frame, and a magnetic brake for the turbine located between the turbine wheel and the cover, said brake comprising relatively movable elements, one of which is fixed and the other carried by the turbine wheel.

2. In an apparatus of the character described, the combination of a main frame having a bearing, a shaft in the bearing having an overhung end, a turbine wheel on such end, a cover for the wheel fastened to the main frame, a magnetic brake for the turbine located between the turbine wheel and the cover, said brake comprising a fixed coil and a moving ring, the ring being carried by the turbine wheel, and means forming a housing for said fixed coil.

3. In an apparatus of the character described, the combination of a main frame having a bearing, a shaft in the bearing having an overhung end, a turbine wheel on such end, a cover for the wheel fastened to the main frame, a magnetic brake for the turbine comprising coils carried by the cover and a ring carried by the turbine wheel, and means forming a housing for said coils.

4. In an apparatus of the character described, the combination of a housing, a shaft therein, a turbine wheel on the shaft, a nozzle for directing steam to the turbine wheel, and means through which steam is fed to the nozzle, said means comprising a casing fixed directly to the housing, a steam separator therein, said casing having an orifice in one of its walls, means carried by the casing and forming a passage connecting the orifice to the nozzle, and a pressure reducing valve in said passage controlled by the steam pressure therein for throttling the flow of steam to the nozzle.

5. In an apparatus of the character described, the combination of a housing, a shaft therein, a turbine wheel on the shaft, a nozzle for directing steam to the turbine wheel, and means through which steam is fed to the nozzle, said means comprising a casing fixed directly to the housing, a steam separator therein, said casing having an orifice in one of its walls, means carried by the casing and forming a passage connecting the orifice to the nozzle, a pressure reducing valve in said passage controlled by the steam pressure therein for throttling the flow of steam to the nozzle, and a pop-safety valve connected with said passage.

6. In an apparatus of the character described, the combination with a turbine having a housing, of means through which elastic fluid is fed to the turbine comprising a casing, a separator therein, an extension on the casing having a circular bore, a hollow plug which fits into the bore and has a passage therein which connects the separator with the interior of the plug, the connection with the separator being through a restricted orifice, a pressure reducing valve in the interior of the plug, and means forming passages connecting the interior of the plug beyond the reducing valve to the turbine casing.

7. In an apparatus of the character described, the combination with a turbine having a housing, of means through which elastic fluid is fed to the turbine comprising a casing, a separator therein, an extension on the casing having a circular bore, a hollow plug which fits into the bore and has a passage therein which connects the separator with the interior of the plug, the connection with the separator being through a restricted orifice, a pressure reducing valve in the interior of the plug, means forming passages connecting the interior of the plug beyond the reducing valve to the turbine casing, and a pop-safety valve carried by the extension and in communication with the last named passage.

8. In an apparatus of the character described, the combination of a housing, a shaft therein, a turbine wheel on the shaft, a nozzle for directing steam to the turbine wheel, and means through which steam is fed to the nozzle, said means comprising a casing fixed directly to the housing, a steam separator therein, an extension on the casing having a circular bore, a hollow plug which fits into the bore and has a passage therein which connects the separator with the interior of the plug, the connection with the separator being through a restricted orifice, a pressure reducing valve in the interior of the plug, and means forming passages connecting the interior of the plug beyond the reducing valve to the turbine casing.

In witness whereof, I have hereunto set my hand this 2nd day of February, 1916.

LOUIS C. LOEWENSTEIN.